(12) United States Patent
Van Broeck

(10) Patent No.: US 9,438,819 B2
(45) Date of Patent: Sep. 6, 2016

(54) METHOD, SERVER, AND TERMINAL FOR CONDUCTING A VIDEO CONFERENCE

(71) Applicant: Alcatel Lucent, Boulogne Billancourt (FR)

(72) Inventor: Sigurd Van Broeck, Zoersel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 23 days.

(21) Appl. No.: 14/387,053

(22) PCT Filed: Mar. 19, 2013

(86) PCT No.: PCT/EP2013/055628
§ 371 (c)(1),
(2) Date: Sep. 22, 2014

(87) PCT Pub. No.: WO2013/139761
PCT Pub. Date: Sep. 26, 2013

(65) Prior Publication Data
US 2015/0085056 A1 Mar. 26, 2015

(30) Foreign Application Priority Data

Mar. 23, 2012 (EP) .................................. 12305343

(51) Int. Cl.
*H04N 7/15* (2006.01)
*H04N 5/262* (2006.01)
*G06F 3/01* (2006.01)
*H04N 7/14* (2006.01)

(52) U.S. Cl.
CPC ............ *H04N 5/2628* (2013.01); *G06F 3/013* (2013.01); *H04N 7/147* (2013.01); *H04N 7/15* (2013.01)

(58) Field of Classification Search
CPC ........ G06F 3/013; H04N 7/147; H04N 7/15; H04N 7/14; H04N 5/2628; H04M 3/567; H04M 3/22; H04M 3/5072
USPC ........... 348/14.01–14.16; 370/260, 265, 267; 379/202.01; 709/204
See application file for complete search history.

(56) References Cited

U.S. PATENT DOCUMENTS

| 6,717,607 | B1 | 4/2004 | Lauper et al. | |
|---|---|---|---|---|
| 8,416,715 | B2* | 4/2013 | Rosenfeld et al. | ........... 370/267 |
| 2005/0168402 | A1 | 8/2005 | Culbertson et al. | |
| 2011/0267422 | A1* | 11/2011 | Garcia et al. | ............. 348/14.16 |

FOREIGN PATENT DOCUMENTS

EP 2 355 499 A1 8/2011

OTHER PUBLICATIONS

International Search Report for PCT/EP2013/055628 dated May 28, 2013.

* cited by examiner

*Primary Examiner* — Melur Ramakrishnaiah
(74) *Attorney, Agent, or Firm* — Fay Sharpe, LLP

(57) ABSTRACT

A method for conducting a video conference, said method comprising: visualizing representations of a plurality of conference participants on a display of a terminal; detecting a gazing direction of a user of said terminal; determining a first observation relationship between said user and a first one of said conference participants (U1), said first one of said conference participants (U1) being identified by correlating said detected gazing direction with a presently observed one of said visualized representations; and visually differentiating said representation of said first one of said conference participants (U1).

13 Claims, 6 Drawing Sheets

METHOD, SERVER, AND TERMINAL FOR CONDUCTING A VIDEO CONFERENCE

FIELD OF THE INVENTION

The present invention relates to the field of video conferencing, and in particular to improving the interaction between participants in a video conference.

BACKGROUND

Eye gaze is a useful element when communicating in group with three or more people. The eye gaze information is useful for the person talking, in order to direct his attention to a specific person and to get feedback from him; for the listeners, in order to understand who the speaker is talking to and whom (or what) the other listeners are looking at; and for turn-taking. As such, people can see each other (visibility), they know that other people can see them (awareness), and they know that the other people know that they can see them (accountability). The latter is referred to as social translucency.

In face-to-face conversations, the eye gaze of an individual is easy to detect. However, in today's multi-party video calls (Computer Mediated Communications), all participants are looking almost directly into their small monitor at the (mosaic of) other people whereby eye gaze direction is almost completely lost. As a result, each individual feels as if every other participant is looking directly at him. All participants therefore feel that they get much more attention than they would normally attract or deserve in the given social setting. The social translucency is completely lost.

SUMMARY

It is an object of embodiments of the present invention to provide a technical solution to re-introduce eye gaze information to users of a video conferencing system in a natural way.

According to an aspect of the invention, there is provided a method for conducting a video conference, the method comprising: visualizing representations of a plurality of conference participants on a display of a terminal; detecting a gazing direction of a user of the terminal; and determining a first observation relationship between the user and a first one of the conference participants (U1), the first one of the conference participants (U1) being identified by correlating the detected gazing direction with a presently observed one of the visualized representations; and visually differentiating the representation of the first one of the conference participants (U1).

It is an advantage of the method according to the invention that the display will confer a less cluttered impression, because the participant of interest will be rendered in a special way, reducing the user's distraction by other visualized representations. Furthermore, the system provides visual feedback pertaining to the fact that the user is looking at a particular correspondent, thus making the user aware that his attention towards this particular correspondent is being noticed, which provides a more natural context for visual communication.

In an embodiment, the method according to the present invention, further comprises obtaining a second observation relationship between the first one of the conference participants (U1) and a second one of the conference participants (U2) that is presently being observed by the first one of the conference participants (U1); and if the second one of the conference participants (U2) is not the user, visually differentiating the representation of the second one of the conference participants (U2).

It is an advantage of this embodiment that a user is made aware of the focus of the participant that he is presently watching. This "second-order observee" is distinctly visualized, to allow the local user to better understand the actions of his own focus person. In particular, if the focus participant is talking, it is very useful for the local user to known whom this participant is talking to (or at least, looking at).

In an embodiment, the method according to the present invention, further comprises, if the second one of the conference participants (U2) is the user, signaling the occurrence of a mutual gaze to the user.

It is an advantage of this embodiment that the user is made aware of the occurrence of the virtual equivalence of "eye contact", i.e., the situation in which the local user is looking at a particular participant, and this participant is looking back at him.

In a particular embodiment, the method further comprises obtaining a third observation relationship between a third one or third ones of the conference participants (U3) and the user; and visually differentiating the representation of the third one or third ones of the conference participants (U3).

It is an advantage of this embodiment that the user achieves awareness of who is currently watching him.

In a particular embodiment, the differentiating comprises applying a first modification type to the representations of all of the conference participants other than the first one of the conference participants (U1) and the second one of the conference participants (U2), and applying a second modification type to the representations of all of the conference participants other than the first one of the conference participants (U1) and the third one or third ones of the conference participants (U3).

It is an advantage of this embodiment that the correspondent to whom the user's attention is presently directed appears in the "normal" (i.e. unmodified) form, while the remaining correspondents appear in a representation that is modified according to whether they are the object of the focus correspondent's attention and whether they are presently looking at the local user.

In a more particular embodiment, the first modification type and the second modification type are a reduction in resolution and a reduction in color palette or vice versa.

It is an advantage of this embodiment that the visual modifications, which happen by definition in a region of the display that the local user is not focusedly looking at, are of a kind to be easily perceived even when they appear in the peripheral vision of the user.

According to an aspect of the invention, there is provided a computer program comprising software means which, when executed, perform the method as described above.

According to an aspect of the invention, there is provided a video conferencing server for use in the method described above, the server being operatively connectable to a plurality of terminals having eye gaze tracking means and arranged to relay audiovisual feeds between the plurality of terminals, wherein the server is configured to perform the visual differentiations in accordance with observation relationships obtained from the eye gaze tracking means.

This aspect provides a particularly advantageous division between the functions of the server and the functions of the terminals in carrying out the method according to the present invention. In particular, bandwidth and/or processing power may be saved by conducting the visual processing in a server, relative to an alternative scenario where all the visual processing is performed by the terminals.

According to an aspect of the invention, there is provided a terminal for conducting a video conference, the terminal comprising a display adapted to visualize representations of a plurality of conference participants; eye gaze tracking means, configured to repeatedly detect a gazing direction of a user of the terminal; and processing means, operatively coupled to the eye gaze tracking means, the processing means being configured to determine a first observation relationship between the user and a first one of the conference participants (U1), the first one of the conference participants (U1) being identified by correlating the detected gazing direction with a presently observed one of the visualized representations; the terminal being configured to visually differentiate the representation of the first one of the conference participants (U1).

In an embodiment, the terminal according to the present invention further comprises an input interface adapted to receive a second observation relationship between the first one of the conference participants (U1) and a second one of the conference participants (U2) that is presently being observed by the first one of the conference participants (U1); the terminal being configured to visually differentiate the representation of the second one of the conference participants (U2).

In an embodiment, the terminal according to the present invention further comprises a mutual gaze indicator, and the terminal is configured to activate the mutual gaze indicator if the second one of said conference participants (U2) is the user.

In an embodiment of the terminal according to the present invention, the input interface is further adapted to receive a third observation relationship between a third one of the conference participants (U3) and the user, the terminal being configured to visually differentiate the representation of the third one of the conference participants (U3).

In a particular embodiment, the visual differentiation is achieved by applying a first modification type to the representations of all of the conference participants other than the first conference participant (U1) and the second conference participant (U2), and applying a second modification type to the representations of all of the conference participants other than the first conference participant (U1) and the third conference participant (U3).

In a more particular embodiment, the first modification type and the second modification type are a reduction in resolution and a reduction in color palette or vice versa.

According to an aspect of the invention, there is provided a system comprising a plurality of terminals as described above.

The effects and advantages of the various embodiments of the computer program, the server, the terminal, and the system according to the invention, correspond mutatis mutandis to those explained in connection with the corresponding embodiments of the method according to the invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Figure 1:
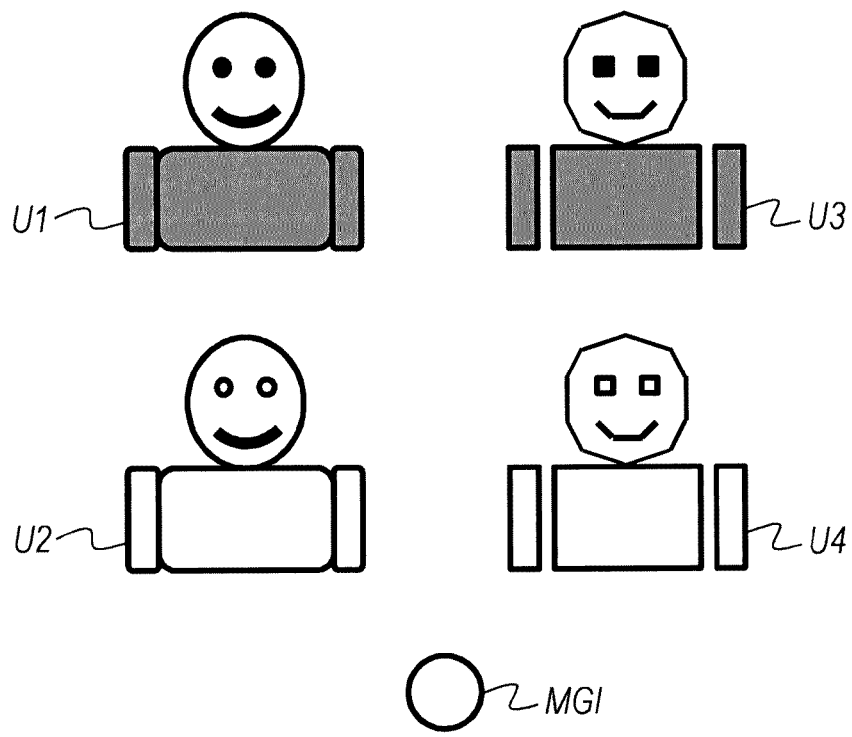
FIG. 1 illustrates an exemplary visualization of conference participants in accordance with an embodiment of the present invention.

FIG. 1 illustrates an exemplary visualization of conference participants on a terminal screen, in a video conferencing system in which the present invention is used. Without loss of generality, four conference participants are represented. For technical reasons, representations intended to be color images are represented in this application as grayscale images, and representations intended to be black-and-white or grayscale images are represented as line drawings.

Throughout the description of the embodiments, the reference signs introduced in FIG. 1 will be used to refer to the different (categories of) conference participants.

Hereinafter, an "observation relationship" between a first user and a second user will be understood to designate a situation in which the first user is directly looking at the visual representation of the second user on his video conferencing terminal. The video conferencing terminal (or simply "terminal") used in embodiments of the present invention may be a dedicated apparatus, a general-purpose computer with adequate software, a combination of a television set and a set-top box, or any other suitable combination of software and hardware as would be readily appreciated by a person skilled in the art.

Figure 2:
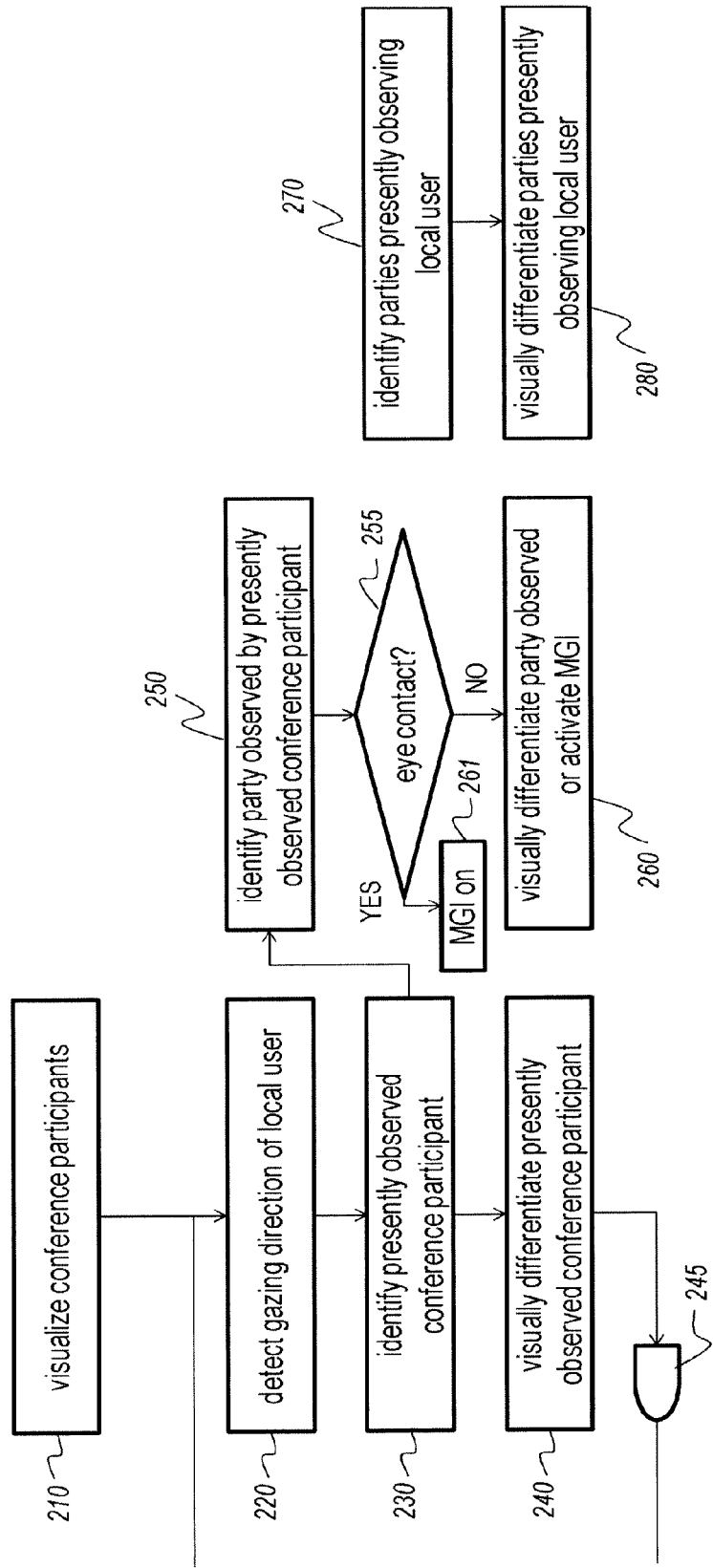
FIG. 2 presents a flowchart of a method according to an embodiment of the present invention.

A method according to an exemplary embodiment of the present invention will now be described in connection with the flow chart provided in FIG. 2. Representations of a plurality of conference participants U1-U4 are visualized 210 on a display of a terminal. The terminal is equipped with eye gaze tracking means, which detect 220 a gazing direction of a user of the terminal. On the basis of this information, a first observation relationship is determined 230 between the user and a first conference participant U1, the first conference participant U1 being identified by correlating the detected gazing direction with a presently observed one of the visualized representations. Accordingly, the representation of the first conference participant U1 is visually differentiated 240, relative to the representations of the other participants.

The method preferably comprises obtaining 250 a second observation relationship between the first conference participant U1 and a second conference participant U2 that is presently being observed by the first conference participant U1. If the second conference participant U2 is not the local user himself, the representation of the second conference participant U2 is visually differentiated 260 relative to the representations of the other participants. If the second conference participant U2 is in fact the local user himself 255, the occurrence of a mutual gaze is signaled 261 to the user by means of any appropriate signal MGI. This signal MGI (mutual gaze indicator) indicates the occurrence of the virtual equivalent of eye contact, and may take the form of an icon appearing on the display near the representation of conference participant U1. Additionally or alternatively, it may take the form of a sound being emitted when eye contact occurs; preferably a subtle, non-disturbing sound.

The method preferably further comprises obtaining 270 a third observation relationship between one or more third conference participant(s) U3 and the user. The representation of the third conference participant(s) U3 is visually differentiated 280 relative to the representations of the other participants.

In a particular embodiment, the differentiating 240, 260, 280 comprises applying a first modification type to the representations of all of the conference participants other than the first conference participant U1 and the second conference participant U2, and applying a second modification type to the representations of all of the conference participants other than the first conference participants U1 and the third conference participant(s) U3.

The foveal area of a normal person is only a few degrees wide. In essence and on average, the user has a very high visual acuity of only about 3°. The user can capture a lot of detail in that area. The peripheral view on the other hand has a low visual acuity but is especially trained for visual attention. With his peripheral view, the user can notice changes in his environment a lot better than with his foveal view. Embodiments of the present invention are based on the insight of the inventor that by using appropriate signaling methods tailored to the perception capabilities in the peripheral view of humans, status information of video conference participants that are not being watched actively can be transmitted to the user in an efficient way. The issue of social translucency can be resolved in this manner.

In particular, changes in color or resolution of a displayed image would be easily perceived by a user of a video conferencing terminal, even when these changes take place in the peripheral view of the user. Accordingly, embodiments of the present invention use changes in color and/or resolution of the displayed representations of video conference participants to signal information about their activity, in particular about the objects or participants they are currently looking at. In a particular embodiment, the aforementioned first modification type and second modification type are a reduction in resolution and a reduction in color palette or vice versa.

The mosaic of FIG. 1 was created in accordance with this particular embodiment. In summary, the information conveyed by the mosaic of FIG. 1 is therefore as follows:

The presently observed user is user U1. In this visualization, user U1 is rendered in high resolution and in color.

The user presently observed by user U1 is user U2. In this visualization, that user U2 is rendered in high resolution but in black and white.

The user that is looking at the local user is user U3. In this visualization, that user U3 is rendered in color but in low resolution.

Finally, user U4 is looking at something or someone else and is not being looked at by user U1. In this visualization, that user U4 is rendered in low resolution and in black and white.

Since there is no mutual gaze between the local user and his presently observed user U1, the mutual gaze indicator MGI is not lit.

The differentiated visualization of the present invention is of a dynamic nature. That is, the detection 220 and the optional obtaining 250, 270 are repeated intermittently, in order to update the associated representations 240, 260, 280. A change from an undifferentiated state (e.g., the state of user U4 in the preceding example) to a differentiated state (e.g., the state of user U1, U2, or U3 in the preceding example) should happen sufficiently swiftly to keep the important information on the display up to date and to catch the local user's attention. On the other hand, changes from a differentiated state to an undifferentiated state may be applied more gradually, to avoid unnecessarily attracting the local user's attention. Moreover, the detecting 220 of the local user's gaze should not be so frequently updated as to be sensitive to the normal rapid and insignificant "scanning" movement of a user's eye. In particular, the time constant of the eye gaze detection 220 should be sufficiently relaxed to avoid unnecessarily detecting a shift of focus each time one of the other represented participants changes status, causing an instantaneous back-and-forth movement of the user's gaze. This constraint is schematically illustrated in FIG. 2 by means of the delay step 245.

Hence, in one preferred embodiment of the present invention, the eye-gaze translucency method consists of 4 parts 1. All Gaze Information Related to the User's Gaze is Provided in High Resolution The eye-gaze position of the user's foveal view will be captured and translated to the subject he is looking at. If the subject is a person A, then the eye gaze position of that person A is also captured and translated to the subject he is looking at. To the person A and the subject B, no resolution filter is applied. They are therefore both rendered in high resolution. To all other subjects in the scene, a low resolution filter is applied.

2. All Gaze Information Related to the User is Provided in Color

The eye-gaze position of the user's foveal view will be captured and translated to the subject he is looking at. To this subject, no color filter is applied. The subject is therefore rendered in color. Additionally, the eye-gaze position of all other user's foveal view is captured and translated to the subjects they are looking at. If one of these subjects is the self, no color filter is applied. These user(s) are therefore rendered in color. To all other subjects in the scene, a black-and-white filter is applied.

3. Mutual Gaze Indicator

The eye-gaze position of all other user's foveal view is captured and translated to the subjects they are looking at. If one of these subjects is the self, then the eye-gaze position of the user's foveal view will be captured and translated to the subject he is looking at. If the subject is a person corresponding to the other person that's gazing at the self, then the visualization of a mutual gaze indicator will be triggered accordingly.

4. High-Resolution and Color Transitions

When a high resolution, a high color or a mutual gaze condition is not met anymore, the corresponding filter is applied slowly as not to disturb the peripheral view of the user in accordance with the new situation. However, if a high resolution, a high color or a mutual gaze condition is met due to a change in gaze of the user, the filter is removed rapidly as to not disturb the foveal view of the user in accordance with the new situation.

Alternative ways to differentiate the representations are possible by applying an alternative filter (1) for the black and white filter for everything related to the local user's gaze and (2) for the low resolution filter for everything related to the local user. Alternative filters for low resolution include, without limitation, pan (down), tilt (squeeze), zoom (out), blur (edges), or frame rate (reducing the number of frames per second, i.e. the temporal resolution). Alternative filters for black and white include, without limitation, color (reduction), contrast (down), intensity (down), camera angle (away), gamma transformation. Other alternative filters that may be for either type of differentiation include, without limitation, halo, gloom, underline or frame, 3rd object, picture freezing, or avatar replacement.

In particular embodiments, a mutual background is provided to all users.

In particular embodiments, the local user is also visually represented on the display, optionally after applying a mirroring transformation. The local user may look at himself, i.e. his own representation, in which case this representation is treated as user U1 and visually differentiated as such. In accordance with the aforementioned preferred embodiment, the user would thus see his own image in high resolution and full color, with the optional MGI being activated. Conversely, his own image would be in reduced resolution and black-and-white whenever the user is looking at any other conference participant or object. It is an advantage of these particular embodiments that the level of "immersion" experienced by the user is increased.

In particular embodiments, the audio is also mixed such that it corresponds to the positions of the users on the screen. For instance, when a particular remote user is sitting to the right side of the local user (at the right side of the local user's screen), then the voice of that particular remote user will be mixed in the right audio channel of the local user.

The functions required by the method according to the present invention may be distributed among terminals and an optional central node or server in a variety of ways. Accordingly, the server according to the invention and the terminal according to the invention that will be described hereinafter may be considered to be alternative solutions to the particular problem of implementing the invented method in specific equipment.

Figure 3:
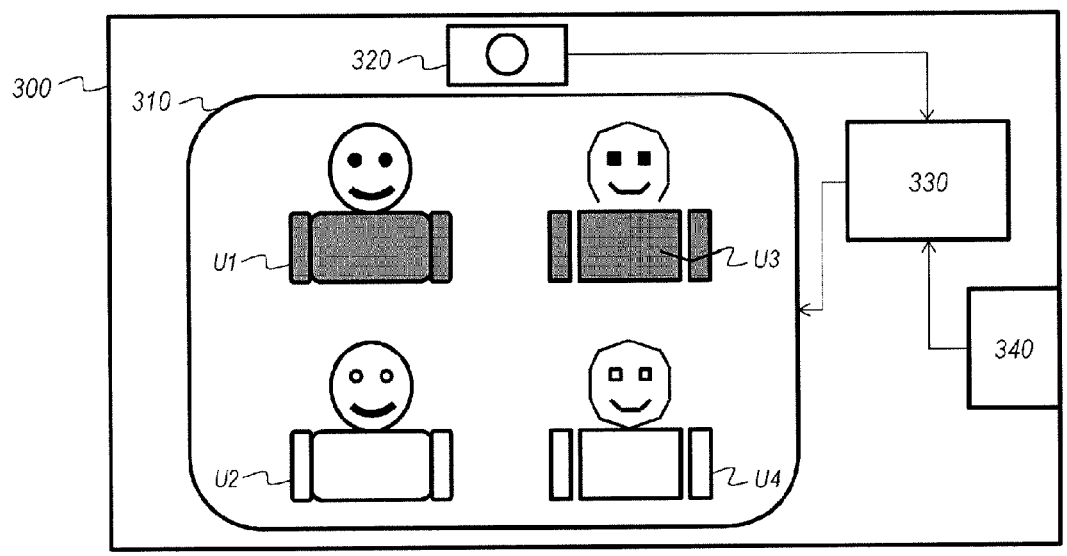
FIG. 3 schematically illustrates a terminal according to an embodiment of the present invention.

The invention thus also pertains to a terminal for conducting a video conference, which will be described in connection with FIG. 3. Elements of the video conferencing terminal 300 according to the invention that are common to known video conferencing terminals are omitted from the present description. The terminal 300 comprises a display 310 adapted to visualize representations of a plurality of conference participants U1-U4. The representations are preferably video feeds, captured at the terminals of the conference participants, which may be transformed or modified in accordance with the invention. The representations may alternatively be avatars selected by these conference participants. A mix of video feeds and/or avatars and/or hybridized avatar/video entities may also appear. The terminal 300 further comprises eye gaze tracking means 320, configured to repeatedly detect a gazing direction of a user of the terminal 300. Eye gaze tracking means are known in the art, and typically operate on the basis of an analysis of a digital image of the eyes of the local user (the viewer). Such a digital image for eye gaze detection purposes may be obtained from the same camera which provides the video feed of the local user for the purpose of conducting the video conference. The terminal 300 further comprises processing means 330, operatively coupled to the eye gaze tracking means 320, configured to determine a first observation relationship between the user and a first conference participant U1, this first conference participant U1 being identified by correlating the detected gazing direction with the presently observed representation. The terminal 300 is configured to visually differentiate the representation of the first conference participant U1, i.e. the conference participant that is presently being watched by the local user.

Preferably, the terminal 300 also comprises an input interface 340 in order to receive a second observation relationship between the first conference participant U1, i.e. the conference participant presently being watched by the local user, and a second conference participant U2 that is presently being observed by the first conference participant U1. The terminal 300 is configured to visually differentiate the representation of the second conference participant U2.

Preferably, the input interface 340 is further adapted to receive a third observation relationship between a third conference participant U3 and the user. The terminal 300 is configured to visually differentiate the representation of the third conference participant U3.

The term "interface" designates the necessary hardware and software required to establish data communication connectivity over a network link across the various layers of the protocol stack, as is well known to a person skilled in the art. Preferably, standardized protocols are used. An access interface may for instance include an interface for an xDSL, xPON, WMAN, or 3G link. A LAN interface may for instance include an interface for one or more of an IEEE 802.3 "Ethernet" link, an IEEE 802.11 "Wireless LAN" link. A PAN interface may for instance include a USB interface or a Bluetooth interface. The interface 340 may partly or wholly coincide with the interface used for the exchange of the video feeds which are part of the video conference.

The invention also pertains to a terminal configured to apply the aforementioned modifications at the source, to reduce the overall required bandwidth.

Figure 4:
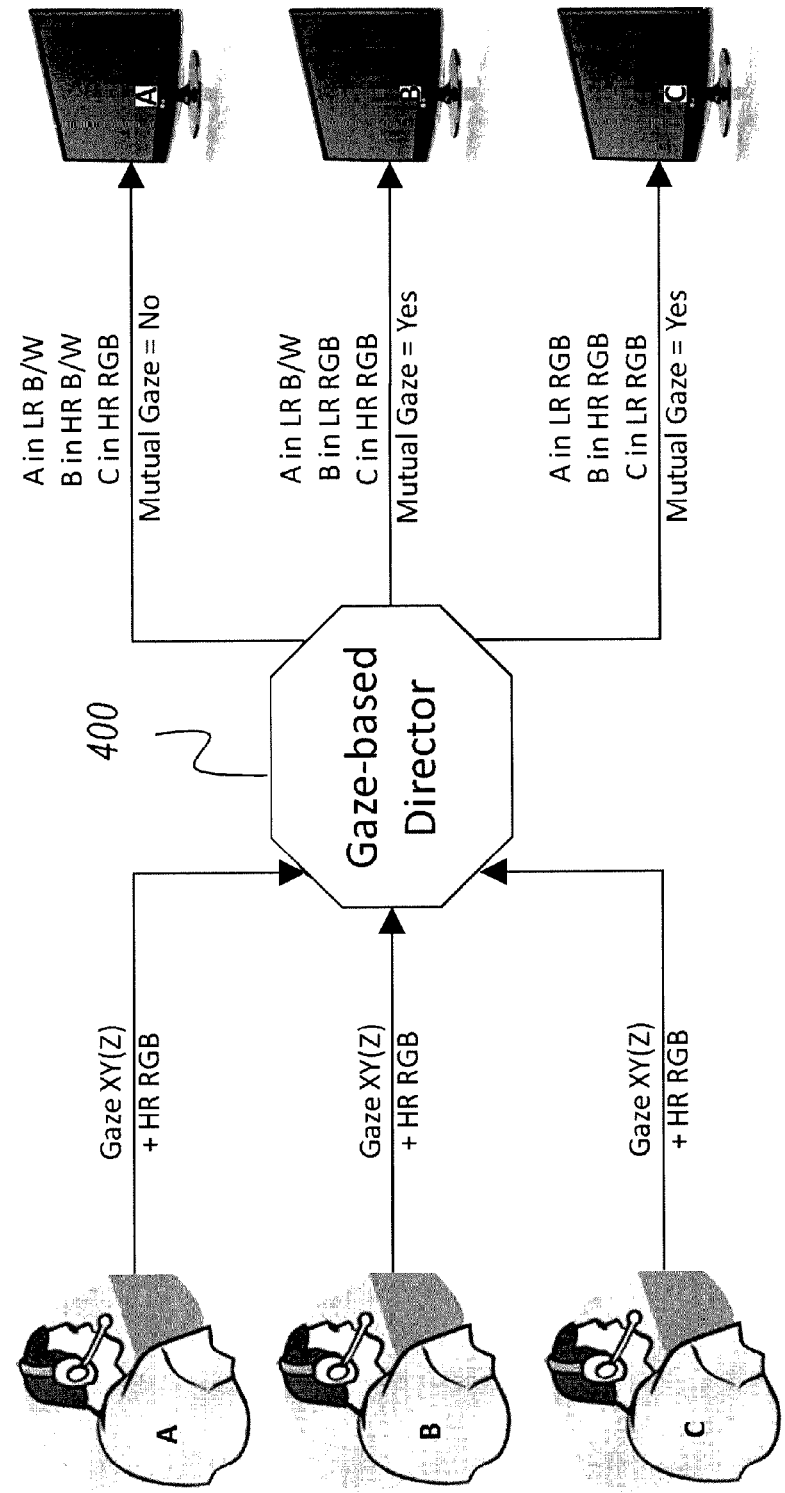
FIG. 4 schematically illustrates the use of a server according to an embodiment of the present invention.

The invention thus also pertains to a video conferencing server for use in the method described above, which will be described in connection with FIG. 4. The server 400 is operatively connectable to a plurality of terminals having eye gaze tracking means and arranged to relay audiovisual feeds between the plurality of terminals, wherein the server is configured to perform the visual differentiations in accordance with observation relationships obtained from the eye gaze tracking means. The server may be arranged to receive the eye gaze correlation information from the connected terminals, determine the appropriate status of each of the correspondents vis-à-vis the remaining correspondents, and provide a set of appropriately filtered or modified video feeds to each of the correspondents.

In embodiments of the present invention, the streaming video of the user may be encoded in a scalable way (by the originating terminal or by the optional server) such that a low-resolution and/or black/white picture can be retrieved easily without the need for additional filtering.

The streaming video used in embodiments of the present invention may be stereo- or multiscopic video. The scenery used in embodiments of the present invention may be a 3D scene.

Figure 5:
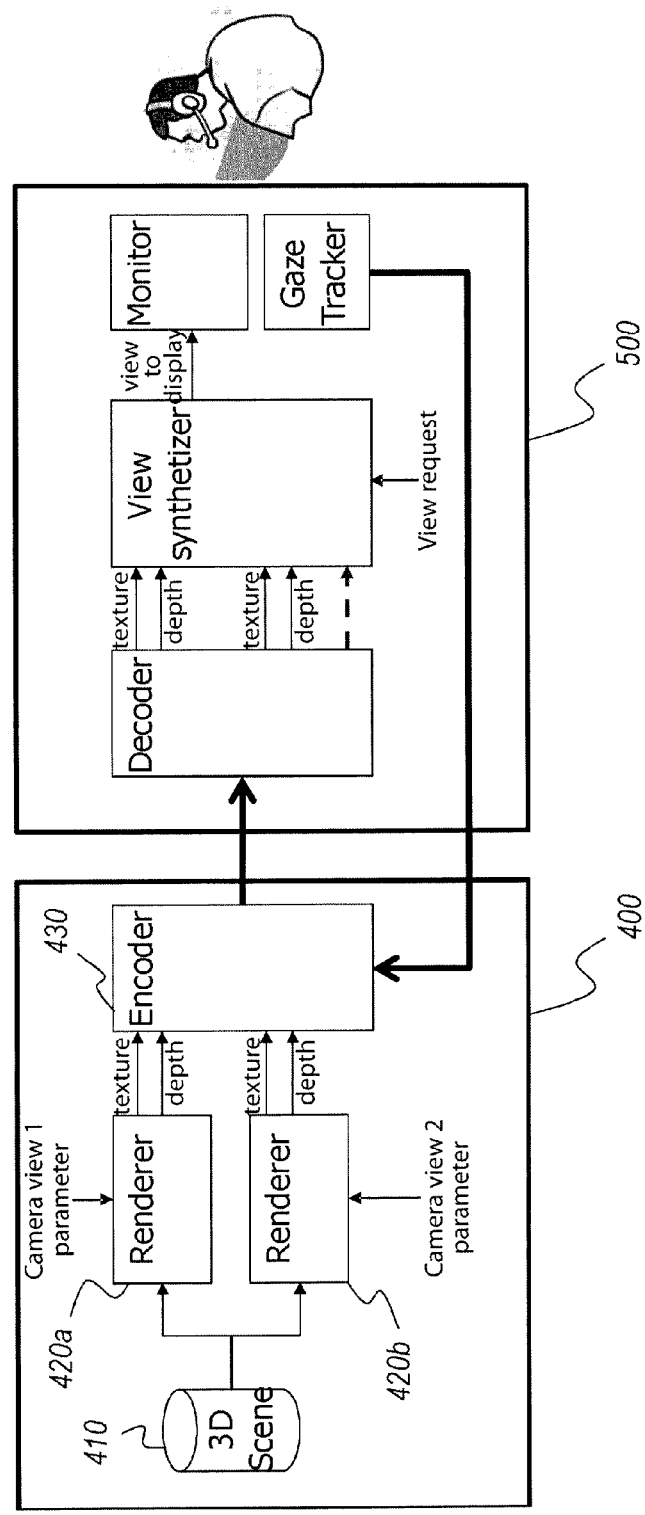
FIG. 5 schematically illustrates an encoding means as may be used in embodiments of the present invention.

FIG. 5 illustrates a server 400 constituting a variant of the present invention, the server 400 comprising an encoder 430, operatively connected to a number of renderers 420a, 420b, of which two instances are shown without loss of generality, configured to produce the same number of different views of a scenery 410, in which the representations of the conference participants are embedded. An adapted terminal 500 displays the scenery in accordance with a viewpoint selected by the local user, which may be an interpolated viewpoint or an exact viewpoint as provided by the server 400. The terminal 500 captures gaze information of the local user, which is correlated with a particular conference participant or scenery object, in accordance with the selected viewpoint. The correlation may occur at the terminal 500 or at the server 400. In the former case, the correlation information (i.e. the observation relationship) is communicated back to the server 400; in the latter case, the gaze direction is communicated back to the server 400. Based on this information received from the terminal 500 and from the terminals of the other conference participants (not shown), the server 400 instructs its encoder 430 to apply the appropriate visual modifications (e.g. filters) in accordance with the rules explained hereinabove. If visual differentiation is performed by reducing resolution and/or color palette as described above, this configuration provides the advantage of requiring less bandwidth on the link between the server 400 and the terminal 500, because most representations can be transmitted in reduced resolution and/or black-and-white.

The same configuration may be applied, mutatis mutandis, with the same advantage, in a serverless peer-to-peer setting, wherein the role of the server 400 of FIG. 5 is assumed by the respective peer terminals. Accordingly, an adapted terminal may in that case provide the visualization of its local user to its respective correspondents in accordance with the respective required visual representations. In particular, an adapted terminal would send a full-color high-resolution feed of its local user only to those terminals whose user is presently looking at the aforementioned local user.

Figure 6:
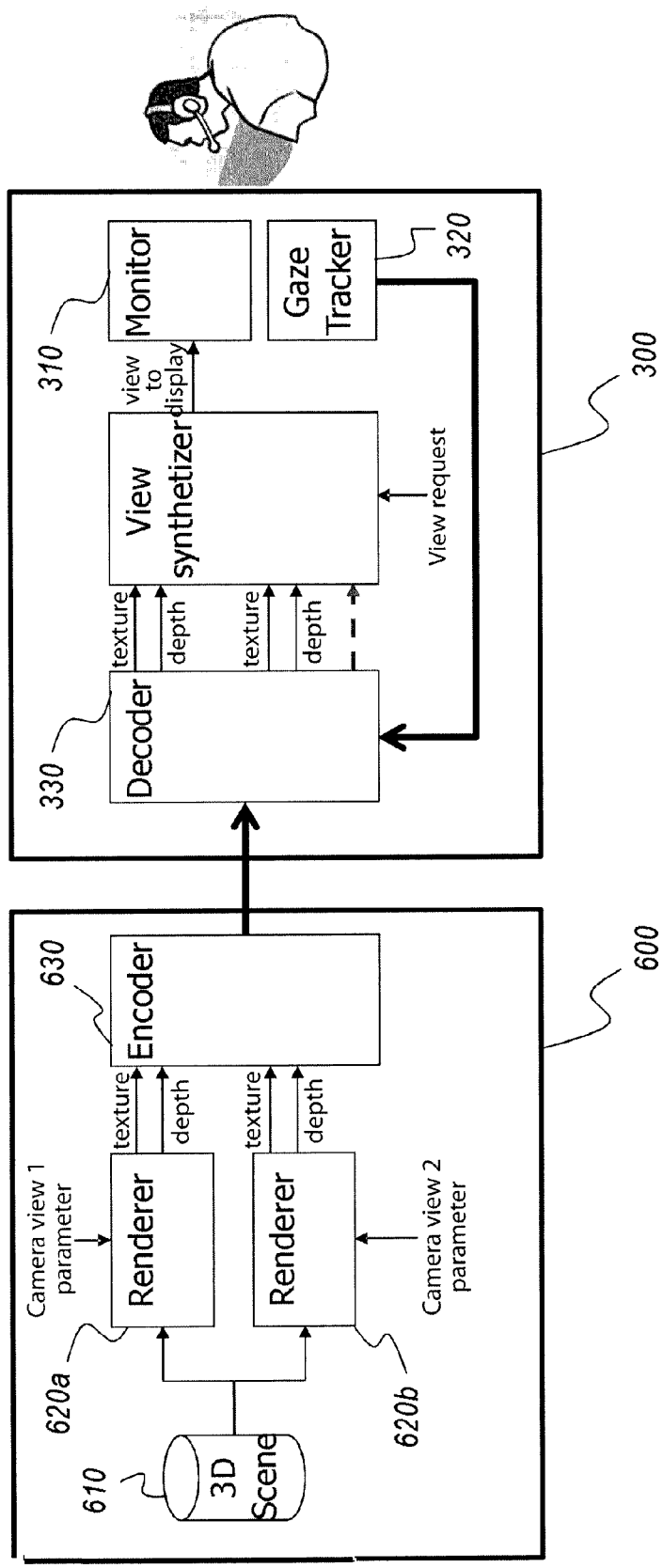
FIG. 6 schematically illustrates an decoding means as may be used in embodiments of the present invention.

FIG. 6 illustrates another server 600 cooperating with a terminal 300 that constitutes a further variant of the present invention, the server 600 again comprising an encoder 630, operatively connected to a number of renderers 620a, 620b, of which two instances are shown without loss of generality, configured to produce the same number of different views of a scenery 610, in which the representations of the conference participants are embedded. The terminal 300 displays the scenery on its display 310 in accordance with a viewpoint selected by the local user, which may be an interpolated viewpoint or an exact viewpoint as provided by the server 600. The terminal 300 captures gaze information of the local user with its gaze tracker 320, wherein the gaze direction is correlated with a particular conference participant or scenery object, in accordance with the selected viewpoint. The correlation occurs at the terminal 300. The correlation information (i.e., the observation relationship) is communicated back to the server 600 for the benefit of the other conference participants, and selected observation relationships pertaining to other conference participants are received in return. Based on the locally determined observation relationship and the information received from the server 600, the decoder 330 in the terminal is configured to apply the appropriate visual modifications (e.g. filters) in accordance with the rules explained hereinabove. Most preferably, the visual "modifications" are applied by simply selected the appropriate quality layer from a scalably encoded visual feed obtained from the server 600.

The same configuration may be applied, mutatis mutandis, with the same advantage, in a serverless peer-to-peer setting, wherein the role of the server 600 of FIG. 6 is assumed by the respective peer terminals. Accordingly, an adapted terminal may in that case provide the visualization of its local user to its respective correspondents in a scalable format, so as to allow easy extraction of the appropriate quality level by the recipient, in accordance with the respective required visual representations.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for conducting a video conference, said method comprising:
   visualizing representations of a plurality of conference participants on a display of a terminal;
   detecting a gazing direction of a user of said terminal;
   determining a first observation relationship between said user and a first one of said conference participants,
   said first one of said conference participants being identified by correlating said detected gazing direction with a presently observed one of said visualized representations;
   visually differentiating said representation of said first one of said conference participants;
   obtaining a second observation relationship between said first one of said conference participants and a second one of said conference participants that is presently being observed by said first one of said conference participants; and
   if said second one of said conference participants is not said user, visually differentiating said representation of said second one of said conference participants.

2. The method according to claim 1, further comprising:
   if said second one of said conference participants is said user, signaling the occurrence of a mutual gaze to said user.

3. The method according to claim 1, further comprising:

obtaining a third observation relationship between a third one or third ones of said conference participants and said user; and visually differentiating said representation of said third one or third ones of said conference participants.

4. The method according to claim 3, wherein differentiating comprises applying a first modification type to said representations of all of said conference participants other than said first one of said conference participants and said second one of said conference participants, and applying a second modification type to said representations of all of said conference participants other than said first one of said conference participants and said third one or third ones of said conference participants.

5. The method according to claim 4, wherein said first modification type and said second modification type are a reduction in resolution and a reduction in color palette or vice versa.

6. A computer program comprising software which, when executed, perform the method of claim 1.

7. A video conferencing server for use in the method according to claim 1, said server being operatively connectable to a plurality of terminals having an eye gaze tracker and arranged to relay audiovisual feeds between said plurality of terminals, wherein said server is configured to perform said visual differentiations in accordance with observation relationships obtained from said eye gaze tracker.

8. A terminal for conducting a video conference, said terminal comprising:

a display adapted to visualize representations of a plurality of conference participants;

an eye gaze tracker, configured to repeatedly detect a gazing direction of a user of said terminal;

a processor, operatively coupled to said eye gaze tracker, said processor being configured to determine a first observation relationship between said user and a first one of said conference participants, said first one of said conference participants being identified by correlating said detected gazing direction with a presently observed one of said visualized representations said terminal being configured to visually differentiate said representation of said first one of said conference participants;

an input interface adapted to receive a second observation relationship between said first one of said conference participants and a second one of said conference participants that is presently being observed by said first one of said conference participants; and said terminal being configured to visually differentiate said representation of said second one of said conference participants.

9. The terminal according to claim 8, further comprising a mutual gaze indicator, said terminal being configured to activate said mutual gaze indicator if said second one of said conference participants is said user.

10. The terminal according to claim 8, wherein said input interface is further adapted to receive a third observation relationship between a third one of said conference participants and said user;

said terminal being configured to visually differentiate said representation of said third one of said conference participants.

11. The terminal according to claim 10, wherein said visual differentiation is achieved by applying a first modification type to said representations of all of said conference participants other than said first conference participant and said second conference participant and applying a second modification type to said representations of all of said conference participants other than said first conference participant and said third conference participant.

12. The terminal according to claim 11, wherein said first modification type and said second modification type are a reduction in resolution and a reduction in color palette or vice versa.

13. A system for conducting a video conference, said system comprising a plurality of terminals according claim 8.

* * * * *